THREE DIMENSIONAL FUNCTION GENERATOR

Filed Jan. 16, 1961 7 Sheets-Sheet 1

INVENTOR.
HANS K. HERZOG

BY

ATTORNEYS

Nov. 24, 1964 H. K. HERZOG 3,158,739

THREE DIMENSIONAL FUNCTION GENERATOR

Filed Jan. 16, 1961 7 Sheets-Sheet 2

INVENTOR.
HANS K. HERZOG
BY
Reynolds & Christensen
ATTORNEYS

Nov. 24, 1964 H. K. HERZOG 3,158,739

THREE DIMENSIONAL FUNCTION GENERATOR

Filed Jan. 16, 1961 7 Sheets-Sheet 3

INVENTOR.
HANS K. HERZOG
BY
Reynolds & Christensen
ATTORNEYS

Nov. 24, 1964 H. K. HERZOG 3,158,739

THREE DIMENSIONAL FUNCTION GENERATOR

Filed Jan. 16, 1961 7 Sheets-Sheet 4

INVENTOR.
HANS K. HERZOG
BY
Reynolds & Christensen
ATTORNEYS

Nov. 24, 1964 H. K. HERZOG 3,158,739

THREE DIMENSIONAL FUNCTION GENERATOR

Filed Jan. 16, 1961 7 Sheets-Sheet 5

INVENTOR.
HANS K. HERZOG
BY
Reynolds & Christensen
ATTORNEYS

INVENTOR.
HANS K. HERZOG
BY
Reynolds & Christensen
ATTORNEYS

INVENTOR.
HANS K. HERZOG
BY
Reynolds & Christensen
ATTORNEYS 3,158,739
Patented Nov. 24, 1964

3,158,739

THREE DIMENSIONAL FUNCTION GENERATOR

Hans K. Herzog, Bellevue, Wash., assignor to Boeing Airplane Company, Seattle, Wash., a corporation of Delaware Filed Jan. 16, 1961, Ser. No. 82,838
26 Claims. (Cl. 235—197)

This invention relates to computer apparatus for generating a variable voltage (or current) representing a selected three dimensional function $z$ of two nonanalytic variables $x$ and $y$ applied as control voltages or currents (viz., $z=f(x;y)$). In essence the computer as disclosed comprises an electronic analog device capable of solving systems of simultaneous differential equations, equations in which the variables are or may be nondependent. As such, the device is capable of handling a wide range of problems for which such conventional analog equipment as multipliers, resolvers and other basic function generators are inadequate. The invention is herein illustratively described by reference to the presently preferred embodiment thereof; however, it will be recognized that certain modifications and changes therein with respect to details may be made without departing from the essential features involved.

While analog generators of three dimensional functions of nonanalytic variables have been proposed heretofore in an effort to fulfill the great need for such a device, they have been either too slow of response for most purposes (i.e., due to the use of moving cams and other mechanical elements) or they have been overly complex, requiring vast numbers of electronic components in order to represent even a limited number of individual known values for $z$. A typical problem for which the present invention is suited is that of analyzing the characteristics of a turbo-compressor in order to study dynamic control system requirements using analog computer equipment. Simulation of the characteristics of a complex system of that type was not feasible with prior function generators. There are many other important practical problems in the fields of mechanics, hydraulics, pneumatics, electrical systems, aerodynamics, etc., for which a device of the type herein disclosed has long been needed.

Another object of the present invention is to provide a three-dimensional function generator having a rapid response characteristic and in other respects suitable for incorporation in a closed loop analog computer system.

A related object is an electronic analog device of the type described which is relatively simple and permits the practical solution of complex problems requiring representation of a large number of individual known values of function $z$ set into the device, and which generates values for $z$ between the known values thereof with a degree of accuracy which is sufficiently close for all practical purposes. This it accomplishes by interpolating for $z$ automatically whenever the input signals or control variables call for a value of $z$ with coordinates other than any of those at which $z$ is known or set. Furthermore, the invention permits varying or adjusting the coordinate or grid-line values of either or both variables $x$ and $y$ at which the $z$ values are represented in the apparatus and between which the interpolations are made. This may be done in order to concentrate the resolving or defining power of the system to a greater or lesser degree in the more critical or less critical regions of the function $z$ (i.e., where the curves change most rapidly or most slowly).

Greater accuracy or definition is also achieved herein than in certain prior devices by representing the $z$ values directly with individual potentiometer or voltage divider settings and linearly interpolating for $z$ between those settings, rather than to compute the value of $z$ based on the settings of potentiometers representing the variable functions themselves. Moreover, with the present system it is only necessary to set into the apparatus the desired grid-line control points or breakpoints (i.e., the established points where $z$ is known and between which interpolations are made) and the measured values of $z$ at those points, and it is not necessary to rely upon settings representative of slope or rates of change between breakpoints as in certain previously proposed apparatus.

Interpolation is accomplished in the device along the two grid or coordinate lines preferably by two distinct and different methods. Interpolation along one grid line or coordinate is accomplished by continuously computing the weighted average of the values of the function at the adjacent two nearest coordinate or grid line values at which $z$ is known or set (i.e., breakpoint values). This weighted averaging is achieved in this instance by switching rapidly back and forth between those values and allowing dwell time for each determined by the relative proximity thereof to the instantaneous value of the variable. Such a system yields linear interpolation.

A further and related object is to provide still another linear system of interpolation which can be used along the other coordinate or grid line, which is directly compatible in the total system with the aforementioned switching system of interpolation, and which to this latter end does not rely upon switching back and forth between breakpoint values of the function. In achieving this objective, interpolation is accomplished by continuously summing the instantaneous value of a linearly changing increment of the function with the sum of algebraically predetermined grid-line breakpoint values thereof located in the region between the instantaneous value of the function and the point of origin of the grid line. For this purpose the grid-line breakpoint values are algebraically predetermined so that they are not directly the two values of the function but which, when so added together or summed, produce a net output which does directly represent the function. In the preferred embodiment an arbitrary negative slope function is also included in the algebraic sum, and the breakpoint or preset values of $z$ are accordingly adjusted, in order to permit the function to change in sign or polarity as well as in magnitude while permitting the grid-line breakpoint values of $z$ all to be represented by voltages of the same polarity.

The aforementioned combination of two different types of interpolation systems for the respective coordinates avoids problems of interference and filtering which arise due to phase or frequency relationships if the switching method or weighted averaging is used in both coordinates.

An additional feature resides in the summing method of interpolation using the aforementioned negative slope generator which produces an arbitrary fraction (preferably one-half, in order to permit equal positive and negative excursions of $z$) of the summation of the output voltages of so-called energizers or matrix line selectors in the system. This latter summation in turn is directly proportional to the instantaneous value of the variable (coordinate) itself, corrected for any differences in the intervals between its values at successive grid-line breakpoints.

The disclosed analog function generator solving the equation $z=f(x;y)$ simulates a rectangular coordinate grid for the variables $x$ and $y$, and at the points of intersection of the coordinate lines incorporates individual potentiometers preset to represent the known values of $z$. Thus, in a representative case, a matrix of 400 such potentiometers arranged, for example, in 20 rows and 20 columns permits representation of 400 known specific values of function $z$ and an infinite number of intermediate interpolated values thereof. Adjustable feedback potentiometers associated with the respective matrix line energizers of both coordinates determine by their respective settings the grid-line breakpoint values and are preferably adjustable in order to permit varying these values so as to establish equal spacing between breakpoints or any desired variation in spacing therebetween. These feedback potentiometers establish the threshold levels of the different matrix lines in which the different potentiometers, representing different values of function $z$, become energized as the variables progressively change in value.

Thus any desired three-dimensional function of two variables (nonanalytic or otherwise) may be handled effectively by this versatile computer, which has a rapid response characteristic and is sufficiently simple that the necessary large number of known values of the function and the desired distribution of those values along the two coordinates may be preset into the apparatus to afford a close degree of accuracy in the result over a wide range of variation in the control conditions.

These and other features, objects and advantages of the invention will become more fully evident from the following description thereof by reference to the accompanying drawings.

Figure 5:
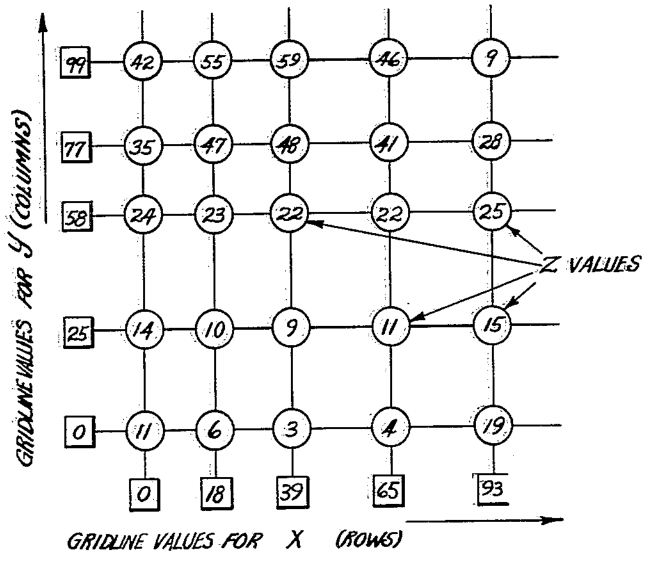

FIGURE 5 is a diagram showing such a three dimensional function $z$ mapped in a matrix of intersecting grid or coordinate lines representing distinct values of the two variables $x$ and $y$, and with known values for function $z$ being assigned to the points of intersection. In the computer disclosed herein these known values for $z$ are represented by the settings of $z$ potentiometers or voltage dividers electrically located at the matrix intersections and the location of the respective grid lines are established by rows of $x$ and $y$ feedback potentiometers.

Figure 6:
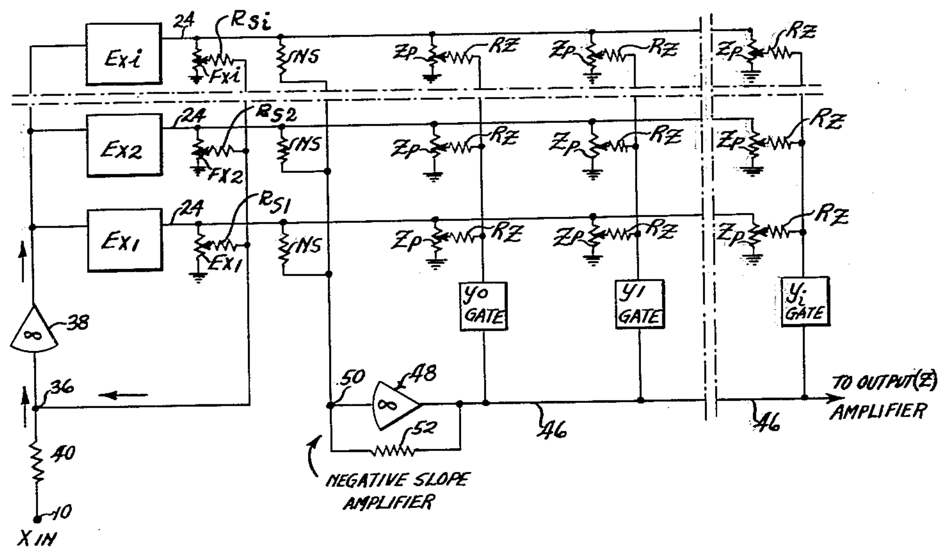

FIGURE 6 is a simplified combined block and schematic diagram of the preferred arrangement for controlling output voltage $z$ as a function of one variable ($x$ in the illustrated case). This arrangement employs the summing method of interpolation mentioned above.

Figure 7:
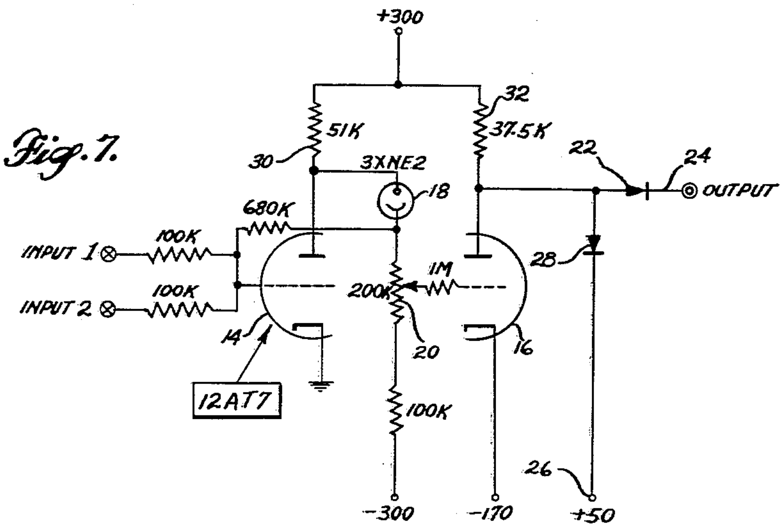

FIGURE 7 is a schematic of a suitable circuit for each of the $x$ energizers $E_x$ appearing in FIGURE 6.

Figure 8:
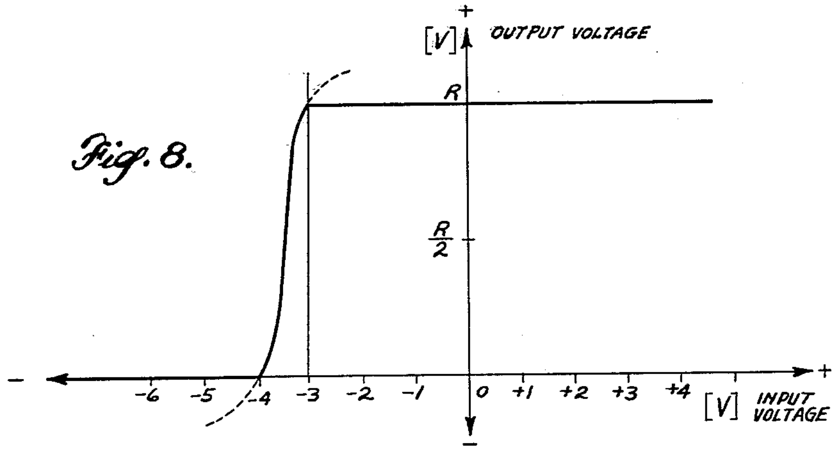

FIGURE 8 is a graph depicting the operating characteristic of an $x$ energizer.

Figure 9:
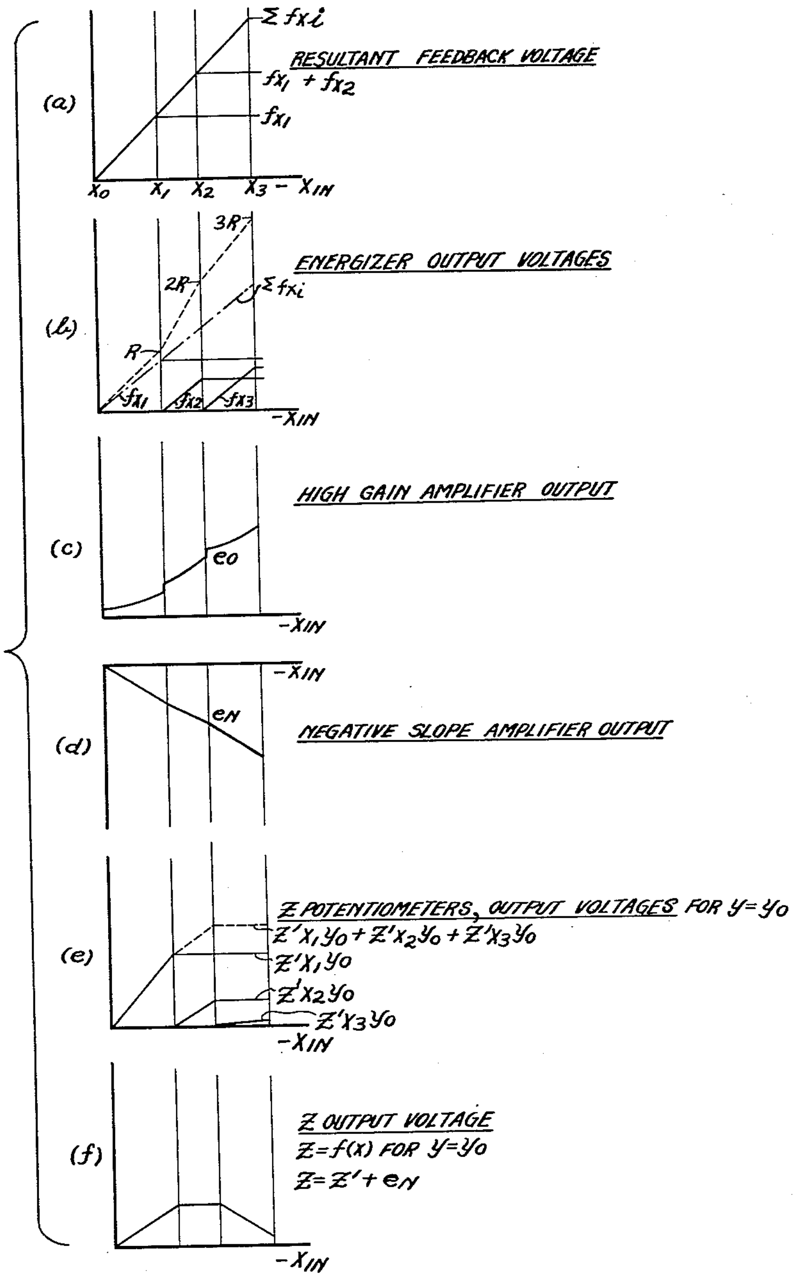

FIGURE 9 is a series of graphical diagrams explaining the theory of operation of the control and interpolation system shown in FIGURE 6.

Figure 10:
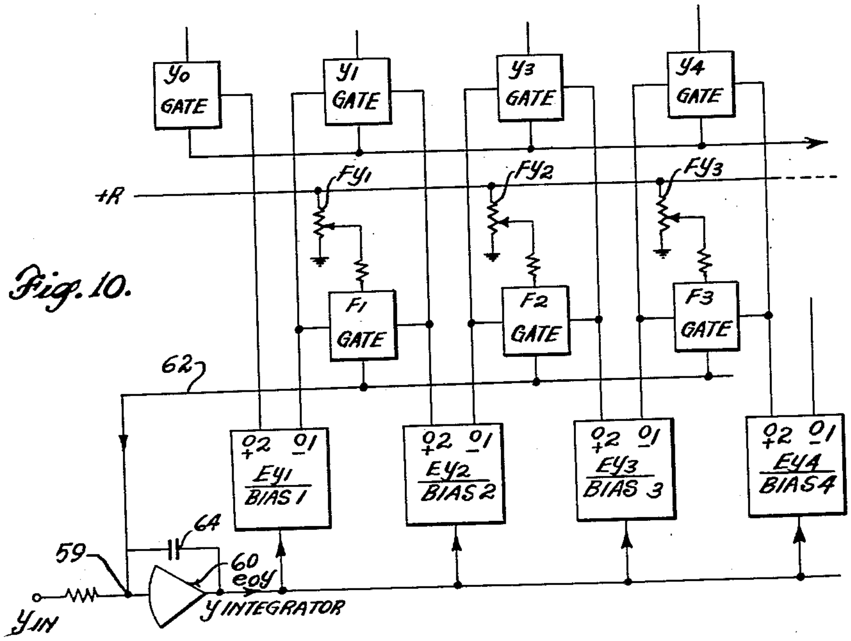

FIGURE 10 is a simplified combined block and schematic diagram of the preferred arrangement for controlling output voltage $z$ as a function of the second variable (in this case $y$). This arrangement employs the switching system of interpolation mentioned above.

Figure 11:
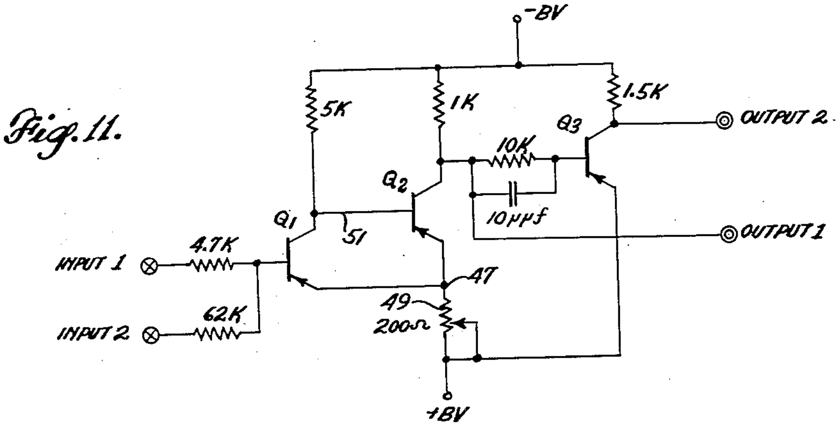

FIGURE 11 is a schematic of a suitable circuit for each of the $y$ energizers $E_y$ appearing in FIGURE 10.

Figure 12:
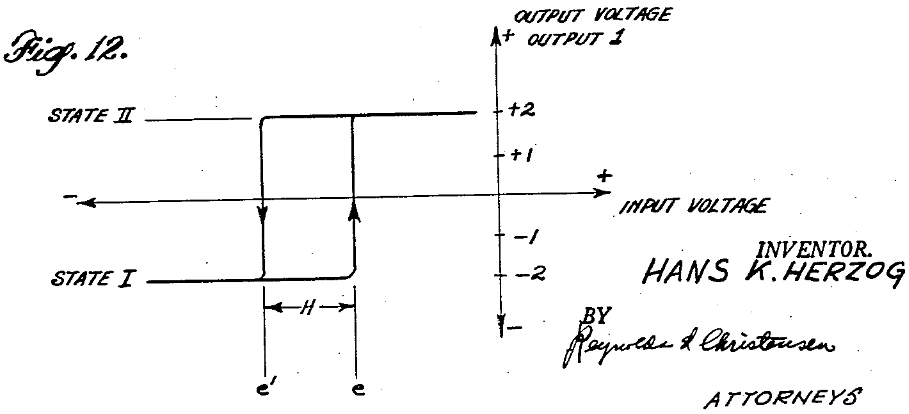

FIGURE 12 is a voltage diagram showing the operating characteristic of a $y$ energizer.

Figure 13:
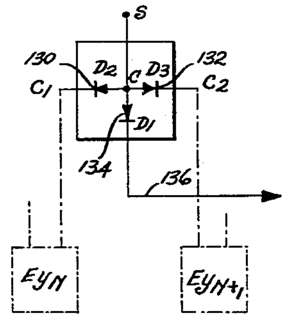

FIGURE 13 is a schematic of one of the voltage-controlled gate circuits appearing in FIGURE 10.

Figure 1:
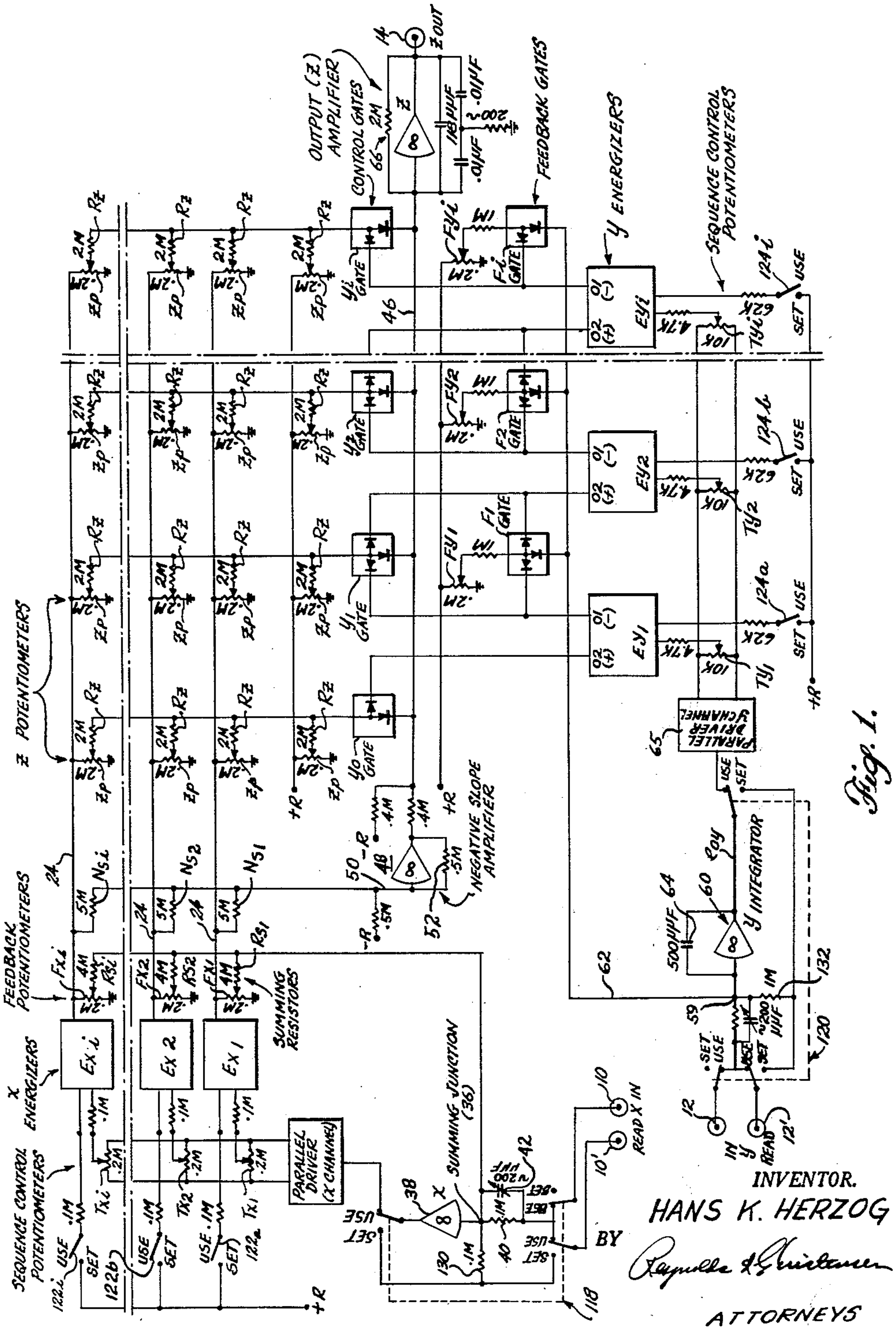
FIGURE 1 is a block diagram of the improved three dimensional function generator in its presently preferred form.
Figure 14:
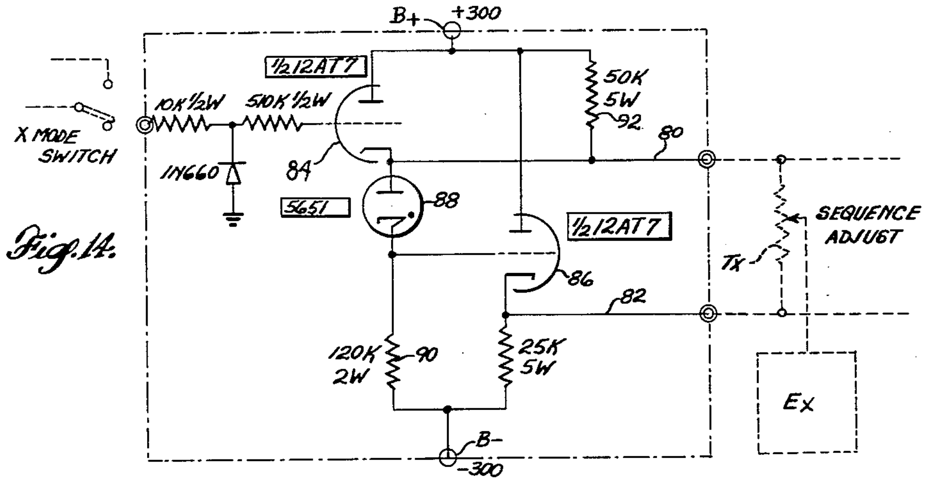

FIGURE 14 is a schematic of a suitable low output impedance driving amplifier termed the parallel driver ($x$ channel) in FIGURE 1.

Figure 15:
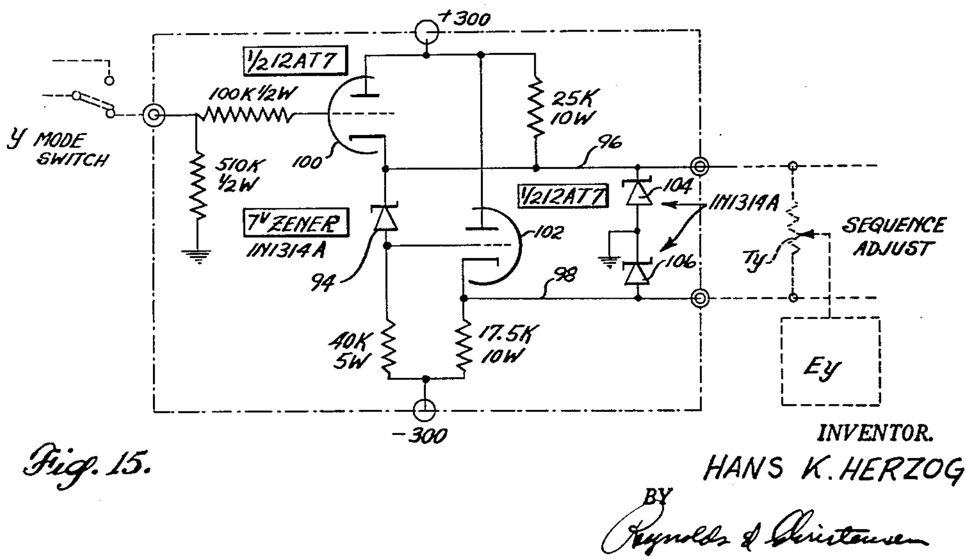

FIGURE 15 is a schematic of a suitable low output impedance driving amplifier designated as a parallel driver ($y$ channel) in FIGURE 1.

In general terms the computer system as illustrated in FIGURE 1 represents conceptually a matrix of intersecting coordinate or grid lines, with a $z$ potentiometer $Z_p$ located at each intersection. Considered in those terms the $z$ potentiometers may be arranged in rows and columns, although the physical arrangement itself is unimportant. The rows, for example, correspond to different values of the input variable $x$ and the columns to different values of the input variable $y$. The wiper setting of each potentiometer $Z_p$ corresponds to the value of function $z$ at its particular set of coordinates $x$ and $y$. The electrical locations of the respective rows of $z$ potentiometers along the $x$ scale are determined by the individual settings of the feedback potentiometers $F_x$ associated with such rows. Likewise the electrical locations of the respective columns of $z$ potentiometers along the $y$ scale are determined by the settings of the feedback potentiometers $F_y$ associated with such columns. The different values of function $z$ represented by the different $z$ potentiometers $Z_p$ are predetermined, as by empirical methods or calculation, for the different sets of coordinates. A control voltage proportional in value to variable $x$ is applied at the $x$ input terminal 10. A second control voltage proportional in value to variable $y$ is applied at a second $y$ input terminal 12. These control voltages, in some systems under study, may vary quite rapidly, with component frequencies of the order of 25 c.p.s. or higher. As the control voltages are applied and undergo variation the computer system generates an output voltage at output terminal 14 which is directly proportional to and varies with the corresponding variations in three dimensional function $z$.

Figure 2:
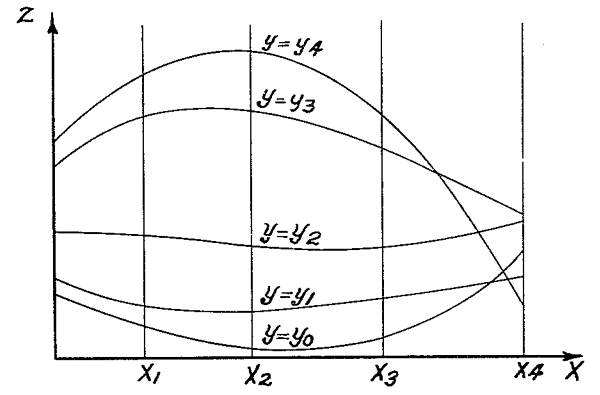
FIGURE 2 is a typical family of curves graphically representing a three dimensional function $z$ defined by variables $x$ and $y$.
Figure 3:
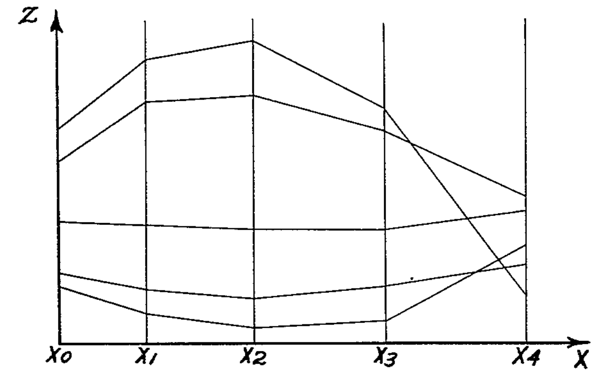
FIGURES 3 and 4 are families of curves showing how function $z$ may be represented graphically, with variables $x$ and $y$ as the abscissae, respectively, and with the values of $z$ shown on the basis of linear interpolation between selected breakpoints along the abscissae.

In order to understand the operation of the circuit and the nature and purpose of its components it is convenient to refer briefly to the graphical illustrations contained in FIGURES 2, 3, 4 and 5. In FIGURE 2 the three dimensional function $z$ is represented by a family of curves with $z$ as the ordinate and $x$ as the abscissa and with each curve indicating variations in $z$ as a function of $x$ with the second variable $y$ held at different constant values, such as $y_0$, $y_1$, $y_2$, etc. FIGURE 3 illustrates how the same family of curves may be closely approximated by successions of straight lines which intersect at selected values for the variable $x$, such as $x_0$, $x_1$, $x_2$, etc. These values for $x$, or breakpoints in the curves, may be evenly spaced along the $x$ scale. However, with a limited number of breakpoints with which to achieve close approximations for the individual curves, it is often necessary or desirable to vary the spacing between the breakpoints on the $x$ scale so that those regions of the function $z$ which vary most radically or sharply can be defined with the same degree of accuracy as regions in which the variation is more gradual or occurs at a constant rate. For example, the spacing between breakpoints $x_0$ and $x_1$ is less than the spacing between breakpoints $x_1$ and $x_2$, whereas the spacing between $x_3$ and $x_4$ is greater. In effect, therefore, the diagram in FIGURE 3 represents variations in function $z$ which are determined by a process of interpolating for $z$ between known successive values thereof which lie at the breakpoints $x_0$, $x_1$, $x_2$, etc.

Figure 4:
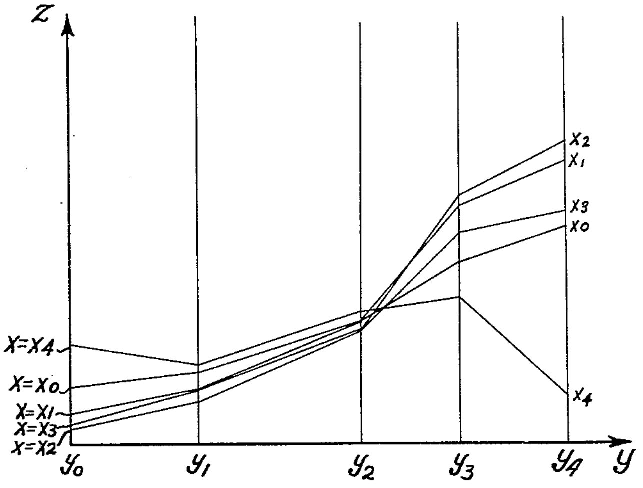

In like manner the graph shown in FIGURE 4 represents a family of curves representing the same function $z$ with the variable $y$ on the abscissa and with the variable $x$ held at different constant values, $x_0$, $x_1$, $x_2$, etc., for the respective curves, with the curves in this case shown in their approximated form as successions of intersecting straight lines symbolic of linear interpolation with respect to the $y$ scale. The computer of this invention operates on the principle of interpolation in respect to both variables $x$ and $y$ and therefore generates the function $z$ as an approximation of its exact value. However, as previously indicated, the present system is so devised that a sufficiently close degree of accuracy is obtained by these approximations for all practical purposes, inasmuch as a large number of known values for the function $z$ may be set into the apparatus as breakpoints for purposes of interpolation and further inasmuch as the locations of those breakpoints may be established most favorably for concentrating the defining power of the computer in accordance with the requirements, as previously mentioned.

In FIGURE 5 the illustrative function $z$ is mapped by laying out a grid of $x$ and $y$ coordinate lines or breakpoints and by assigning values for $z$ to the intersections of the resultant grid lines. The numbers shown in the circles represent the different values for $z$ at the points of intersection, whereas the numbers shown in the squares represent the chosen breakpoint values for $x$ and $y$ along the respective $x$ and $y$ coordinate scales. In the apparatus herein disclosed the values in the circles and in the squares are represented by potentiometer settings. Thus, the different feedback potentiometers $F_x$ in FIGURE 1 may be set in accordance with the different values shown in the squares along the $x$ scale, while the different feedback potentiometers $F_y$ may be set in accordance with the different values shown in the squares along the $y$ scale, and the $z$ potentiometers $Z_p$ may be set in accordance with the different values shown in the circles at the intersections corresponding to the locations of such latter potentiometers in the matrix.

Whereas in a given system there will be a certain available number of potentiometers (such as 20) representing the available number of breakpoint values for the function $z$ along the $x$ scale and a given available number of potentiometers (such as 20) representing the breakpoint values of function $z$ along the $y$ scale, as well as a number of $z$ potentiometers representing the product (400 in this case) of the number of breakpoints along the two scales, it will be recognized that if the three dimensional function $z$ being represented in a given case can be adequately represented with a lesser number of potentiometers the unused potentiometers can be neglected and will not affect the outcome. It will also be evident that a computer may be constructed with any desired numbers of matrix lines.

Referring now to FIGURES 1, 6 and 7, for each row in the matrix of $z$ potentiometers there is an $x$ energizer $E_{x1}, E_{x2}, E_{x3} \ldots E_{xi}$. Each such $x$ energizer constitutes a voltage source having a low output impedance and a high input impedance. Its output voltage is capable of ranging between predetermined lower and upper limits such as between zero and +50 volts with respect to ground and of varying approximately linearly between those limits as a function of an applied control voltage fed to its input. Typically its dynamic gain in this range of variation is of the order of 50. As the value of variable $x$, applied as voltage to input terminal 10, increases from zero, at first there is no change in the $x$ energizers. However, a point is reached, determined by the setting of the first threshold potentiometer $T_{x1}$, at which the first $x$ energizer $E_{x1}$ becomes operative, whereupon further increase in the value of variable $x$ produces corresponding but amplified increases in the output of the $x$ energizer until finally its upper limit is reached. Thereafter, as the value of $x$ further increases, there is no further increase in the output of the first $x$ energizer $E_{x1}$, but the second $x$ energizer $E_{x2}$ becomes operative. This transition to the second $x$ energizer $E_{x2}$ is caused to occur upon upper limiting in the first energizer by appropriately setting the wiper of the second threshold potentiometer $T_{x2}$. However, the amount of increase of variable $x$ required to reach the transition is determined by the setting of feedback potentiometer $F_{x1}$. Thereupon further increases in the value of variable $x$ cause corresponding increases in the output of $E_{x2}$ until its upper limit is reached. The point on the $x$ scale at which this occurs depends on the setting of the second feedback potentiometer $F_{x2}$. The sequence is repeated progressively through the series of $x$ energizers as the input variable increases through its full range, i.e., to the upper limit of the apparatus. Likewise, decreasing values of input voltage applied to terminal 10 through the range cause the $x$ energizers to drop out in their reverse successive order.

In FIGURE 7 a typical $x$ energizer circuit is illustrated. It has two inputs, 1 and 2, representing the calibration or "set" input and the operating input, respectively, and may comprise a simple and inexpensive two-stage vacuum tube amplifier. Its two triode stages 14 and 16 may comprise the two sections of a dual triode tube of ordinary type such as a 12AT7, with both stages being plate loaded and with the bias level at the grid of the second stage being established by a VR tube 18 connected between such grid and the plate of the preceding stage. This VR tube provides coupling to the second stage without appreciably attenuating the signal. The required operating point of the second stage is established by the setting of potentiometer 20. Typical values for the different circuit components are shown on the diagram, including suitable operating voltages for the circuit. However, the circuit is not particularly critical in design or construction.

A diode 22 in the output lead 24 prevents the output voltage from becoming negative. The signal at the output conductor 24 in this illustration varies between zero and +50 volts (i.e., the voltage applied at terminal 26). The signal cannot exceed the voltage at terminal 26 because of the presence of diode 28 in the connection between terminal 26 and the anode of the second stage 16, such diode acting as a clamp. In FIGURE 8 the operating characteristic of such a circuit is illustrated. Referring to the scale of values shown on this graph, a negative voltage of −4 volts or greater, applied to the grid of triode 14, holds the plate current of this triode at a low value. Only a small voltage drop occurs across its load resistance 30. Thus, a high positive potential exists at the plate of tube 14, which drives the tube 16 to maximum conductance and establishes a large voltage drop in the latter's load resistance 32. This places the anode voltage of tube 16 at a value below zero. Thus, because of the presence of diode 22, the voltage at the output conductor 24 is then zero.

A decreasing negative voltage applied to the grid of triode 14 causes an increasing positive output voltage from the $x$ energizer (i.e., at conductor 24) until the plate voltage of triode 16 becomes equal to the applied voltage at terminal 26. Thereupon any further attempted increase in this plate voltage is prevented by the clamping action of diode 28. In the graph (FIGURE 8) this occurs when the input voltage is approximately −3 volts. The solid line shown in FIGURE 8 represents the output voltage variation as a function of input voltage applied to the energizer, and the dotted line extensions of the intermediate portion of the curve indicates the natural characteristic of the two-stage amplifier without the presence of the two limiter diodes 22 and 28. Each energizer operates in a similar manner although, because of the differences in settings of the threshold potentiometers $T_{x1}, T_{x2} \ldots T_{xi}$, they operate in succession (i.e., in successively different portions of the input voltage range).

In order to permit selecting of the locations of the different breakpoints along the $x$ coordinate scale, the winding of a separate feedback potentiometer $F_x$ is connected across the output of each individual $x$ energizer. The potentiometer output signal is fed through a summing resistance $R_s$ to a summing junction 36, along with the signals from the other similar feedback potentiometers, and the input signal (i.e., the voltage $x$) which is applied to input terminal 10. This summing junction is connected to the input of a high-gain amplifier 38, such as an infinite gain operational amplifier. The output of operational amplifier 38 is applied to the parallel driver ($x$ channel) 28, hence to the gang of paralleled threshold potentiometers $T_{x1}, T_{x2} \ldots T_{xi}$. The function of amplifier 38 is to maintain zero net voltage at its input. This it does by virtue of its infinite gain, by producing such a change in its output voltage, when the net input signal becomes anything but zero, as will cause the algebraic sum of the signals applied through input resistance 40 and through the energized summing resistances $R_{s1}$, $R_{s2}$, etc., to be reduced to zero. In order to do this, the amplifier causes maximum energization of a given number (including the number zero) of $x$ energizers, plus partial energization of the next succeeding $x$ energizer in the series. Such operational amplifiers and such a summing technique, as such, are known in the art and the circuit details thereof require no separate description herein. However, their application in the present apparatus is believed to be an important feature of the novel computer system.

It will now be seen that by increasing or decreasing the setting of a feedback potentiometer $F_x$ so that a greater or lesser proportion of its total winding voltage is fed to the summing junction, the corresponding energizer will be driven through its range from zero to +50 volts (or other voltage) more rapidly or slowly, for a given variation in the input signal $x$. This has the effect of decreasing or increasing the spacing between breakpoints for the function $z$ along the $x$ scale, which breakpoints occur at the limits of energization or output voltage of that particular energizer. Thus, by having identical $x$ energizers and identical settings in their associated feedback potentiometers $F_x$, the breakpoints of function $z$ along the $x$ scale will be equally spaced. By having different settings for the feedback potentiometers the breakpoints will be distributed with unequal spacing.

A trim condenser 42 connected across the input resistance 40 intoroduces sufficient anticipation or lead in the effective phase of the input signal $x$ to compensate for any inherent phase lag in the output circuit, such as that resulting from the transfer characteristic of the output filter circuit to be described (i.e., associated with the $z$ amplifier in the output lead).

It will be recognized that in effect there is no necessary direct relationship between the settings of the threshold potentiometers $T_{x1}$, $T_{x2}$, etc., and of the corresponding feedback potentiometers $F_{x1}$, $F_{x2}$, etc., associated with the same individual $x$ energizers. That this is true may be seen from the fact that the settings of the threshold potentiometers determine the successive amplifier output voltage points at which, during increase of the $x$ signal, the successive $x$ energizers become operative to produce an output voltage above the lower limit thereof; whereas, the feedback potentiometers determine the relative rates at which the respectively associated $x$ energizers are driven through their range of variation as a function of the input signal $x$.

With the foregoing as background, the operation of the $x$ energizers as part of the total system for selecting and interpolating values of function $z$ will now be explained. It will be noted that the windings of all $z$ potentiometers $Z_p$ in a given $x$ row are connected between the $x$ energizer output conductor 24 and ground or other point of reference potential common to all. Moreover, the slider settings of the different $z$ potentiometers corresponds to the different desired values of function $z$ to be represented, subject to the peculiar algebraic summing method (involving the negative slope amplifier to be described) alluded to above. The output from each $z$ potentiometer is fed through a separate summing resistance $R_z$ to a common summing junction for all $z$ potentiometers in the same $y$ column. In the $y_0$ column these outputs are added together and applied to one side of a $y_0$ gate, those in the second column to the input of a $y_1$ gate, etc., along the $y$ scale in the matrix. When any of these gates is turned "on" or activated, the summation of signals from the energized $z$ potentiometers in that column is applied to the output ($z$) amplifier as shown. Of course, only those $z$ potentiometers which are energized in the column produce output signals, which in turn depends upon the number of the $x$ energizers then operative and the state of energization of the highest numbered $x$ energizer which is then operative.

The output ($z$) amplifier input conductor 46 constitutes a summing junction to which the sum of $z$ potentiometer outputs in any selected $y$ column is applied along with the output of a negative slope amplifier 48. The input of amplifier 48 includes a summing junction designated 50 to which the summation of output voltages from the then operative $x$ energizers is fed, through the associated individual summing resistances $N_s$, and a feedback signal which is transferred from the output of amplifier 48 to its input through the feedback resistance 52. This has the effect of applying the summation of operative $x$ energizer output voltages to the summing conductor 46 with reversed polarity. In this case that polarity is negative since the output voltage from the operative $x$ energizers are all positive.

The operating theory is seen in the series of diagrams in FIGURE 9. FIGURE 9*a* illustrates the variation of feedback voltage applied to summing junction 36 as a function of input signal $x$. This constitutes a straight-line function of one-to-one slope or rate since the summing resistances $R_{s1}$, $R_{s2}$ . . . $R_{si}$ all have equal values and the sum of the feedback voltages must be equal and opposite to the $x$ input signal due to the infinite gain of amplifier 38.

FIGURE 9*b* illustrates how the settings of feedback potentiometers $F_x$ determine the grid-line voltages or breakpoint adjustments. The dotted line illustrates the summation of $x$ energizer output voltages, and indicates, by the designated points 2R, 3R . . . that each time $-x$ moves from one known value to the next the sum of $x$ energizer output voltages changes by an amount R. The graph also illustrates how the settings of the feedback potentiometers determine the number of $x$ energizers which must be operative and the state of energization of the highest numbered operative energizer, in order to produce a total feedback voltage equal to the input signal. The short jogging lines $f_{x1}$, $f_{x2}$, etc., represent the component feedback voltages supplied from the individual feedback potentiometers, $F_{x1}$, $F_{x2}$, etc.

FIGURE 9*c* illustrates the operation of infinite gain amplifier 38 (i.e., its output voltage as a function of input voltage). Curvature in the lines between breakpoint values $x_0$, $x_1$, $x_2$, etc., illustrates the accommodation of the amplifier 38 to any nonlinearity in the amplification characteristics of the inexpensive two-stage amplifiers comprising the $x$ energizers, whereas the jogs in the curve represent the accommodation of the amplifier 38 to tolerance allowances in the settings of the threshold potentiometers $T_{x1}$, $T_{x2}$, etc. These tolerance allowances are provided in order to assure that one $x$ energizer reaches its upper limit (or lower limit on reverse traversal of its range) before the next succeeding $x$ energizer becomes energized. Without such allowances differences in the characteristics of tubes or exact values of circuit parameters could cause premature energization of one or more of the $x$ energizers during a change of input voltage $x$.

FIGURE 9*d* illustrates the characteristic of the negative slope function generator. As shown in this diagram, the slope of this function changes at different breakpoints $x_1$, $x_2$, etc., if the interval to the respective succeeding breakpoints differs from that to the preceding ones. This is true inasmuch as the maximum voltage contributions of the $x$ energizers are made equal.

FIGURE 9*e* represents the component $z$ potentiometer output voltages in the $y_0$ column as a function of variations of input voltage $x$, the dotted line representing the summation of such $z$ potentiometer output voltages. These component voltages in turn are dependent upon the settings of the respective $z$ potentiometer sliders and are proportional to the product of the associated $x$ energizer output voltages and the respective values of such slider settings.

FIGURE 9*f* represents the summation of the negative slope function amplifier output voltage in FIGURE 9*d* and the dotted line voltage sum appearing in FIGURE 9E, and represents the illustrated output voltage function from the computer (i.e., function $z$ with $y=y_0$, and $x$ variable).

Referring to FIGURES 9*d*, 9*e* and 9*f*, it will now be seen that in order for the output voltage of the computer to represent the true value of function $z$ by the process of summing the outputs from a succession of energized $z$ potentiometers together with the output of the negative function generator, consideration must be given to the slope characteristic of the negative function generator, the instantaneous value of function $z$ at each instantaneous matrix intersection, and the values of $z$ in preceding (i.e., lower numbered) intersections in the same column. In other words, each $z$ potentiometer is set so that its output when added to the sum of the outputs of the $z$ potentiometers in lower numbered rows in the same column will produce a sum which, when added algebraically to the instantaneous value of the negative slope generator output (of opposite polarity) will produce the desired value for $z$. The negative slope function generator, as previously mentioned, provides an output voltage of progressively increasing value as a function of $x$, and which is of opposite polarity to the output polarity of the $x$ energizers. This is done so that the output polarities of the $x$ energizers may all be the same (i.e., positive in this case), thereby simplifying the circuitry. The negative slope amplifier 48 is so designed that its output is one-half the sum of the output voltages of the operative $x$ energizers at any instant. The fraction one-half is arbitrarily chosen as a matter of preference because it permits equal excursions of the function $z$ in both a positive and negative direction from zero, within the operating range of the computer. A different fraction could be chosen for the negative slope amplifier output, or in certain cases the negative slope amplifier could be eliminated if there were no necessity for the system to cope with negative slopes for $z$ with respect to increasing values of either $x$ or $y$. Operational amplifiers 38, 60 and 66 are ordinarily designed to handle both positive and negative input voltages. No attempt is made in FIGURES 2, 3, 4 or 5 to show negative values for $x$, $y$ or $z$.

Moreover, it will be seen that if one of the gates $y_0$, $y_1$, etc., is activated, the resultant signal fed to the output summing conductor 46 will represent the known value of $z$ if $z$ happens to fall at one of the established breakpoints along the $x$ scale and will represent the linearly interpolated value for $z$ if it falls between any two such breakpoints, such interpolation being based on the established values for $z$ at such breakpoints. If the true function $z$ curves in that region, the closer together are those breakpoints, of course, the closer will be the accuracy of the interpolated value. Thus, to utilize an available number of $z$ potentiometers most effectively, the breakpoints are more closely spaced in these regions where $z$ departs most greatly from a constant slope or rate of change.

The system of interpolation along the $y$ scale differs from the summing method just described in that it employs a switching arrangement. In effect, referring to FIGURE 6, whenever the value of variable $y$ lies between two successively adjacent columns or breakpoint values along the $y$ scale, the $y$ gates for the two columns are activated alternately in rapid sequence. The respective periods of activation or dwell time allowed for each are inversely proportional to the differences between the respective breakpoint values of $y$ and the instantaneous value of $y$. In the output the resultant value for $z$ is then computed as the weighted average of the summations of the groups of signals from the energized $z$ potentiometers in the two columns.

Referring to FIGURE 10, this switching system of interpolation is illustrated in a representative embodiment. For each of the $y$ gates $y_0$, $y_1$, etc., there is an associated feedback gate F of similar construction and operated simultaneously with it. The individual $y$ energizers $E_{y1}$, $E_{y2}$, . . . $Ey_i$ cause one of the $y$ gates Y (and associated feedback gate F) to be activated at a given time, so that for a given $y$ input voltage the corresponding function value of $z$ is admitted to the output ($z$) amplifier 66. In the event that:

$$y_{(n-1)}<y_{in}<y_n$$

then by alternately activating the gates $$Y_{(n-1)} \text{ and } Y_n$$

an average value $\bar{z}$ results as an output of the $z$ amplifier:

$$\bar{z}=z_{y_{(n-1)}}+[z_{y_n}-z_{y_{(n-1)}}]\frac{y_{in}-y_{(n-1)}}{y_n-y_{(n-1)}}$$

Thus time division interpolation is performed by the dual control gates and associated energizers depicted in FIGURES 1 and 10, and by the output amplifier with its A.C. rejection filter.

As shown in FIGURE 11 each $y$ energizer typically comprises a transistorized D.C.-controlled binary circuit (Schmidt Trigger) with two outputs, 1 and 2, one of which is 180° out of phase with the other. The circuit includes the two binary stages $Q_1$ and $Q_2$ and a third stage $Q_3$ which serves as a sign changer. In the normal state the output voltages are:

Output 1=−2 volts
Output 2=+2 volts

In the triggered state the output voltages are:

Output 1=+2 volts
Output 2=−2 volts

Referring to FIGURE 12, it is evident that the circuit has two critical levels of control voltage. One is the more positive voltage $e$ at which the devices switch from State I to State II, and the other is the more negative voltage $e'$ at which switching occurs in the reverse. As is apparent to those familiar with such circuits, because of feedback such a circuit drives itself to one of the saturation limits (State I) of the binary. In order to reverse its state a signal that is slightly more than equal in magnitude and opposite in sign to the feedback signal must be applied to the input. The voltage difference between the two critical control levels constitutes hysteresis. In the illustrated circuit two binary stages $Q_1$ and $Q_2$ have a common emitter connection 47. Direct forward coupling through conductor 51 and positive feedback through common emitter resistor 49 provide the trigger action. The coupling is so great that the sign changer $Q_3$ is driven to saturation in both states. High switching speeds are obtained with surface-barrier transistors. A $y$ energizer, by means of respectively different bias adjustments (viz., established by threshold potentiometers $T_{y1}$, $T_{y2}$, etc.), can be set to a predetermined operating point, so that the energizers will change their operating states in consecutive sequence ($E_{y1}$, $E_{y2}$ . . . $E_{yi}$) when a gradually increasing positive driving voltage is applied. When these transitions occur the output voltages for the individual energizers change according to the schedule set forth in the above paragraph, and the sets of gates are activated in sucessive order. Thus, as energizer $E_{y1}$ is triggered from State I to State II, its output $O_1$ becomes positive and, in conjunction with the normal positive voltage at the output $O_2$ of energizer $E_{y2}$, causes activation of gates $Y_1$ and $F_1$. At the same time, the change of output $O_2$ from positive to negative voltage in energizer $E_{y1}$ deactivates the $y$ gate $y_0$. Only one $y$ gate (and its associated feedback gate F) is activated at a given time.

In order to control the energizers the $y$ input signal is applied to the summing junction 59 at the input of a $y$ integrator 60. Through feedback gates $F_1$, $F_2$, etc., and conductor 62 this summing junction also receives the outputs of individual feedback potentiometers $F_{y1}$, $F_{y2}$, etc. Integrator 60 comprises an infinite gain amplifier having a condenser 64 connected between its input and output. Its output is applied to a parallel driver ($y$ channel) 65 which comprises a low output impedance amplifier. The paralleled $y$ threshold potentiometers $T_{y1}$, $T_{y2}$ . . . $T_{yi}$ are driven by amplifier 65.

For a given output voltage of $y$ integrator 60, all $y$ energizers having bias levels (established by the threshold potentiometers) lower than such $y$ integrator output voltage are activated, and all energizers with bias levels higher than that value are deactivated. There is only one pair of successively adjacent $y$ energizers in which the mutually adjacent output terminals thereof are simultaneously positive. Thus, as previously indicated, only the $y$ gate and feedback gate located electrically between that pair of energizers will then be conducting. The $y$ gate admits the function value $z$ to the output amplifier while the feedback gate admits a feedback voltage to the summing junction at the input of the $y$ integrator. The feedback voltage and the $y$ input voltage applied to terminal 12 are of opposite sign. If the magnitude of the feedback voltage differs from that of the $y$ input voltage, then the output of the $y$ integrator, $e_{Oy}$, changes at a linear rate proportional to the difference between them. The voltage $e_{Oy}$ may thus either increase or decrease depending on the sign of the difference. Its rate of increase or decrease depends directly on the magnitude of the difference. If, for example, input voltage $y$ lies between the $y$ scale breakpoint values established by feedback potentiometers $F_{y1}$ and $F_{y2}$, the integrator output voltage $e_{Oy}$ will be alternately increased and decreased linearly between an upper limit established by the setting of threshold potentiometer $T_{y2}$ and a lower limit determined by the hysteresis characteristic of the binary $y$ energizer trigger circuit $E_{y2}$. Thus, the bias values for the $y$ energizers determine when each is activated as $e_{Oy}$ progresses through its range. A quasi-stable condition is reached when the circuit switches back and forth between two feedback voltages, one of which is higher than the input voltage applied to terminal 12 and the other of which is lower than such input voltage. Once cycling commences between two $y$ energizers, the ratio of the lengths of time in which each is energized to activate its $y$ gate and feedback gate is inversely proportional to the magnitude of the respective differences between the related feedback voltages and the instantaneous value of input voltage $y$. Therefore, the related two adjacent $y$ column $z$ potentiometer outputs are applied to the output $z$ amplifier alternately for corresponding periods. The latter with its associated filter network thereby provides a time-averaged value for $z$ which is the desired linearly interpolated value.

The typical gate circuit used in the computer appears in FIGURE 13. It comprises three diodes 130, 132 and 134 having anodes commonly connected to the voltage source S to be gated. When the cathodes of the two control diodes 130 and 132 are both biased positive at potentials above their cathodes, the intermediate diode 134 actively conducts to the output conductor 136. However, if either diode 130 or 132 is biased negatively it serves as a clamp and prevents flow of signal through diode 134. Except for the end gates (i.e., $y_0$ and $y_i$), which require only one control diode, each gate is activated and deactivated by a pair of $y$ energizers. The $y$ gates and feedback gates are similar.

In FIGURE 14 the $x$ channel parallel driver circuit comprises a dual cathode-follower circuit providing the requiste low output impedance to drive the several paralleled threshold potentiometers $T_{x1}$, $T_{x2}$ . . . $T_{xi}$ connected between output conductors 80 and 82. Conductor 80 connects to the cathode of the first stage 84 and conductor 82 to the second stage 86. The first stage is driven by amplifier 38. A gas tube 88 is interposed between the cathode of stage 84 and the load resistance 90 for that stage. This gas tube and resistance are connected serially with a resistance 92 between the B+ and B− supply terminals in a voltage divider, with the grid of stage 86 connected to the junction of resistor 90 and gas tube 88 to establish the quiescent level at the cathode of stage 86 at a value below that of stage 84, the difference being approximately that represented by the voltage drop in the gas tube. As the output of operational amplifier 38 increases or decreases the two cathodes rise and fall together, as do the sliders of the threshold potentiometers $T_x$. Then because there is an established potential difference across the potentiometer windings the desired sequential action of the $x$ energizers is achieved by reason of the settings of those sliders as previously explained.

The reason for using the two-stage cathode-follower circuit in lieu of a single stage is that, here, the signal is not attenuated by different amounts as a result of the differences in the respective potentiometer settings to establish different D.C. bias levels which produce the desired sequential activation of the $x$ energizers. Because the winding terminals (upper and lower) rise and fall together, and the energizers have high input impedance, differences in potentiometer settings do not influence energizer loop gain. If corresponding ends of all threshold potentiometer windings were grounded, however, the loop gain would be different for the different $x$ energizers. To summarize, the $x$ channel parallel driver 28 unloads the high gain amplifier 38, and by reason of its two-stage form, prevents reduction of signal amplitude caused by voltage division by the sequence adjusting (threshold) potentiometers. The circuit diagram shows representative values for the circuit parameters.

The $y$ channel parallel driver 65 shown in FIGURE 15 is similar in nature and basic purpose. It is also a two-stage cathode-follower circuit. In this case the Zener diode 94 is used in the voltage divider instead of a gas tube. The sequence adjusting threshold potentiometers $T_{y1}$, $T_{y2}$, etc., are connected in parallel across output conductors 96 and 98 which in turn connect to the cathodes of stages 100 and 102. Zener diodes 104 and 106 connected serially across the output, and grounded at their common connection, limit the output signal to protect the $y$ energizer transistors against excessive base drive signals. The two stage form of this circuit, wherein output conductors 96 and 98 are driven up and down together, assures that the same maximum and minimum cycling frequency will occur in each $y$ energizer channel despite differences in sequence potentiometer ($T_y$) settings. The latter differences, in case of a single-stage driver, would cause different hysteresis characteristics in the $y$ energizer loops and thereby further complicate the $z$ output filtering problem to remove A.C. components from the computer output signal.

The output filter and amplifier circuit 66 is designed to suppress the A.C. components produced in the cyclic switching action. Its design takes into consideration variations in the cycling frequency due to variations in input voltage, grid line breakpoint voltages, and other factors. The output amplifier, as shown, presents zero output impedance, thereby enabling the computer to be used directly as a building block in any of different analog loop systems without impedance matching problems.

As will be noted in FIGURE 1, the system includes groups of switches each having two mode settings labeled "set" and "use." In the "use" position the system operates as a computer as described above. In the "set" position calibrations and adjustments are made to solve a particular problem. For this latter mode of operation gang switches 118 and 120 in the primary control leads of the $x$ and $y$ channels are moved to the "set" position, which thereby interrupts the connections which make these channels interpolate. The outputs of operational amplifiers 38 and 60 are disconnected from the $x$ and $y$ channel drivers, and are connected to $x$ and $y$ terminals 10′ and 12′, designated "read." To produce a gain of −1, feedback resistances 130 and 132 are connected between output and input of these respective amplifiers. A voltmeter (not shown) may then be connected to each of these terminals to read the amplifier output voltages when the different sequence adjusting switches 122 and 124 respectively associated with individual $x$ and $y$ energizers are placed in their set positions one at a time and the associated individual feedback potentiometers $F_x$ or $F_y$ manipulated to achieve the desired $x$ and $y$ scale breakpoint values. Because the $y$ energizers are capable only of activating and deactivating gates, the feedback potentiometers $F_{y1}$, $F_{y2}$, etc., remain continuously connected to the reference voltage terminal +R and their slider voltages are connected to the summing junction 59.

In order to calibrate or adjust the $z$ potentiometers for the function $z$ the "set" mode is used for switches 118 and 120. This eliminates interference between $z$ potentiometers by stopping the interpolation functions of the apparatus. Now closure of switches 122 and 124 individually and successively, thus: 122*a*, 122*a*+122*b*, 122*a*+122*b*+122*c*, etc., will fully energize energizers $E_{x1}$, $E_{x1}+E_{x2}$, $E_{x1}+E_{x2}+E_{x3}$, etc., and will thus condition all $z$ potentiometers in the respective $x$ rows $x_1$, $x_2$, $x_3$, etc. for adjustment. Similarly with the $y$ energizers and their control switches 124*a*, 124*b*, etc. For example, to adjust the $z$ potentiometer at the matrix intersection $x_3$, $y_3$, the energizers $E_{x1}$, $E_{x2}$, $E_{x3}$, $E_{y1}$, $E_{y2}$, and $E_{y3}$ are all fully energized by closing switches 122*a*, 122*b*, 122*c*, 124*a*, 124*b*, and 124*c*. A voltmeter (not shown) connected to output terminal 14 ($z$ out) indicates when each $z$ potentiometer so adjusted is set correctly for the corresponding breakpoint value of function $z$.

These and other aspects of the invention will be apparent to those skilled in the art.

I claim as my invention:

1. A three-dimensional function generator for the function $z=f(x;y)$, comprising a matrix of $z$ potentiometers having resistances parallel-connected in rows representing predetermined successive values for $x$ and having outputs connected together in columns representing predetermined successive values for $y$, said generator having an output for $z$ and inputs for $x$ and $y$ respectively, a $y$ selector connected to the $y$ input and operable responsively to variations in $y$ to connect the generator output selectively to different columns of $z$ potentiometer outputs related to different values for $y$, respectively, and an $x$ selector connected to the $x$ input and operable responsively to variations in $x$ to apply predetermined energization simultaneously to a variable number of different rows of $z$ potentiometer resistances related to said different values for $x$, respectively.

2. The three-dimensional function generator defined in claim 1, wherein the $y$ selector comprises an interpolator including a plurality of feedback sources producing reference voltages corresponding respectively to said predetermined successive values for $y$, integrator means receptively connected to the $y$ input and operable to integrate the difference between $y$ and any such reference voltage applied to it, normally deactivated feedback gates interposed between such integrator and the respective feedback sources, and sequentially operable means controlled by the integrator to selectively activate said feedback gates individually with connection of the corresponding columns of $z$ potentiometer outputs to the generator output, whereby two adjacent columns are alternately and separately connected to the generator output when $y$ is intermediate the respective predetermined values for $y$ identified with said columns, the generator output including means to average the resultant $z$ output values thereby alternately applied to the generator output.

3. The three-dimensional function generator defined in claim 2, wherein the $x$ selector comprises an interpolator including a plurality of $x$ energizers having a common drive circuit therefor and being successively and cumulatively operated by a progression of voltage delivered by said drive circuit, each such energizer having an output applied to a different row of $z$ potentiometer resistances, said $x$ energizers when operative each producing an output voltage which varies substantially linearly between substantially predetermined upper and lower limits with a progressive variation of drive circuit output voltage, said drive circuit comprising a high-gain amplifier having a summing junction at its input, to which the $x$ input is connected, a plurality of feedback sources connected to be energized by the output of the respective $x$ energizers, means to sum the outputs from the feedback sources by feeding the same to said summing junction, each individual $x$ energizer becoming operative in turn after the next preceding one reaches its limit.

4. The three-dimensional function generator defined in claim 1, wherein the $x$ selector comprises an interpolator including a plurality of $x$ energizers having a common drive circuit therefor and being succesisvely and cumulatively operated by a progression of voltages delivered by said drive circuit, each such energizer having an output applied to a different row of $z$ potentiometer resistances, said $x$ energizers when operative each producing an output voltage which varies substantially linearly between substantially predetermined upper and lower limits with a progressive variation of drive circuit output voltage, said drive circuit comprising a high-gain amplifier having a summing junction at its input, to which the $x$ input is connected, a plurality of feedback sources connected to be energized by the output of the respective $x$ energizers, means to sum the outputs from the feedback sources by feeding the same to said summing junction, each individual $x$ energizer becoming operative in turn after the next preceding one reaches its limit.

5. A three-dimensional function generator for the function $z=f(x;y)$, comprising a matrix of $z$ potentiometers having resistances parallel-connected in rows representing predetermined successive values for $x$ and having outputs connected together in columns representing predetermined successive values for $y$, each such column comprising a common output conductor and summing resistors by which such conductor is connected to said potentiometer outputs, respectively, said generator having an output for $z$ and inputs for $x$ and $y$, respectively, a $y$ selector connected to the $y$ input and operable responsively to variations in $y$ to connect the generator output selectively to different columns of $z$ potentiometer outputs related to different values for $y$, respectively, and an $x$ selector connected to the $x$ input and operable responsively to progressive variation in $x$ to apply predetermined energization to the rows of $z$ potentiometer resistances in successive order cumulatively, such potentiometer resistances undergoing, in turn, substantially linear change of energization between established lower and upper limits common to all, as $x$ progressively changes.

6. A three-dimensional function generator for the function $z=f(x;y)$, having an $x$ and $y$ input and a $z$ output and further comprising an electrical matrix of $z$ elements having energization inputs connected together in rows distributed along an $x$ scale and having voltage outputs connected together in columns distributed along a $y$ scale, selective energizing means responsively connected to the $x$ input and operable to progressively vary the energization state of the individual rows between substantially predetermined lower and upper limits as $x$ progressively varies, said selector means changing such energization states of the rows cumulatively and in turn in their successive order along the $x$ scale as $x$ varies progressively through its range, each such $z$ element having predetermined $x$ and $y$ coordinates and being adapted when its row is at maximum energization to produce a voltage output related to the value of function $z$ for the associated $x$ and $y$ coordinates, a $y$ selector responsively connected to the $y$ input and operable to apply to the generator output the summation of output voltages in the $y$ column to which the instantaneous value of $y$ corresponds.

7. A three dimensional function generator for the function $z=f(x;y)$, having an $x$ and $y$ input and a $z$ output and further comprising an electrical matrix of $z$ elements having energization inputs connected together in rows distributed along an $x$ scale and having voltage outputs connected together in columns distributed along a $y$ scale, selective energizing means responsively connected to the $x$ input and operable to progressively vary the energization state of the individual rows between substantially predetermined lower and upper limits as $x$ progressively varies, said selector means changing such energization states of the rows cumulatively and in turn in their successive order along the $x$ scale as $x$ varies progressively through its range, each such $z$ element having predetermined $x$ and $y$ coordinates and being adapted when its row is at maximum energization to produce a voltage output related to the value of function $z$ for the associated $x$ and $y$ coordinates, a $y$ selector responsively connected to the $y$ input and operable to apply to the generator output the summation of output voltages in the $y$ column to which the instantaneous value of $y$ corresponds, and to alternately apply thereto such summations from successively adjacent $y$ columns which lie on either side of the instantaneous value of $y$, the respective application periods in the latter instance being inversely proportional in duration to the relative proximity of $y$ to the respective column coordinate values for $y$, and means in the generator output operable to time-average the applied values for $z$.

8. The generator defined in claim 7, and a negative function generator controlled by said selective energizing means and connected to apply additively to the generator output, with a polarity opposite the energization polarities of the $z$ element rows, a voltage which varies progressively with the instantaneous summation of energization states of the rows of $z$ elements.

9. The generator defined in claim 8, wherein the $y$ selector comprises an integrator having a summing device at its input to which the $y$ input is connected, a plurality of voltage-controlled column-selective switching devices operated by said integrator to apply the column output voltage summations selectively to the generator output in predetermined successive order as integrator output voltage progresses through a predetermined range, said switching devices further including individual feedback means operated by the respective switching devices and applying to the integrator input summing device different feedback voltages corresponding respectively to the successive column coordinate values for $y$, and with a polarity opposite the polarity of $y$ applied thereto.

10. The generator defined in claim 9, wherein the selective energizing means comprises an interpolator including a plurality of $x$ energizers having a common drive circuit therefor and being successively and cumulatively operated by a progression of voltage delivered by said drive circuit, each such energizer having an output applied to a different row of $z$ element inputs, said $x$ energizers when operative each producing an output voltage which varies substantially linearly between substantially predetermined upper and lower limits with a progressive variation of drive circuit output voltage, said drive circuit comprising a high-gain amplifier having a summing junction at its input, to which the $x$ input is connected, a plurality of $x$-value feedback sources connected to be energized by the output of the respective $x$ energizers, means to sum the outputs from the $x$-value feedback sources by feeding the same to said summing junction, each individual $x$ energizer becoming operative in turn after the next preceding one reaches its limit.

11. The generator defined in claim 10, wherein the $x$-value feedback sources comprise potentiometers invidually adjustable to permit varying the values along the $x$ scale at which the respective rows of $z$ element inputs are established.

12. The generator defined in claim 10, wherein the $x$ energizer drive circuit comprises a plurality of biasing stages individual to the respective $x$ energizers, said biasing stages comprising bias potentiometer windings, with their associated potentiometer sliders operatively connected to the respective $x$ energizers, and amplifier means driven by said high-gain amplifier and connected to energize said potentiometer windings in parallel, said amplifier means having two co-phased low-impedance output terminals across which the bias potentiometer windings are connected, and which are separated by circuit means establishing predetermined quiescent potential difference between them.

13. In an electronic computer, an interpolating selector operable to produce in an output conductor the interpolated value of a function $z=f(x)$ with $x$ between any of predetermined scale values for $x$, said selector comprising, in combination with a plurality of $z$ elements separately energizable and individually adjusted to produce, when energized, an output voltage related to $z$ at said scale values for $x$, respectively, and means to apply the sum of said output voltages to said conductor, a high-gain amplifier to the input of which a control voltage $x$ is applicable, a series of energizers having separate outputs respectively connected to the individual $z$ elements and having separate inputs including a driving circuit with separate threshold controls for the respective energizers causing such energizers to become operable sequentially in response to a progressively varying voltage applied to all such inputs, said energizers when operative individually producing a predetermined limited output voltage variation in response to said applied voltage variation, and feedback means deriving and summing voltages proportional to the respective operative energizer output voltages and applying the sum to the high-gain amplifier input subtractively in relation to the control voltage applied thereto, whereby a given control voltage produces predetermined limited energization of a certain number (i.e., zero or higher) of $z$ elements and partial energization of an additional $z$ element.

14. The combination defined in claim 13, wherein the feedback means comprise potentiometers having windings respectively connected across the energizer outputs and having sliders connected through a summing circuit to the high-gain amplifier input, said potentiometers being separately adjustable in order thereby to vary the established values of control voltage at which the different energizers become operative.

15. In an electronic computer, selector means operable to apply to an output conductor the voltage on any of a plurality of coordinate conductors in accordance with the value of an applied control voltage $y$, said selector means comprising a plurality of feedback sources producing reference voltages corresponding respectively to predetermined successive values for $y$, integrator means having a summing device in its input to which control voltage $y$ is applicable, said integrator means being operable to integrate the difference between $y$ and any such reference voltage applied to said summing device, normally deactivated feedback gates interposed between said summing device and the respective feedback sources, normally deactivated selector gates interposed between the output conductor and the respective coordinate conductors, and sequentially operable means controlled by the integrator and operatively connected to the respective feedback gates and corresponding selector gates to selectively activate corresponding selector gates in sequential order with progressive variation in the integrator output.

16. In an electronic computer, an interpolating selector operable in response to variations in a control voltage $y$ to produce in an output conductor the interpolated value of a function $z=f(y)$ when $y$ lies between any of predetermined scale values for $y$, said selector comprising, in combination with a plurality of $z$ voltage sources operable to produce voltages related to $z$ at said scale values for $y$, respectively, a $y$ voltage input, an integrator having a summing device at its input to which the $y$ input is conncted, a plurality of voltage-controlled switching devices operated by said integrator to connect the $z$-source output voltages selectively to the output conductor in predetermined successive order as integrator output voltage progresses through a predetermined range, said switching devices further including individual feedback means operated by the respective switching devices and applying to the integrator input summing device different feedback voltages corresponding respectively to the successive scale values for $y$, and with a polarity opposite the polarity of $y$ applied thereto.

17. The generator defined in claim 16, wherein the individual feedback means comprise energized potentiometers separately adjustable to vary the output voltages thereof and thereby the successive electrical locations of the $z$-sources along the $y$ scale.

18. The generator defined in claim 17, wherein the selective switching devices each include a voltage-controlled trigger circuit having first and second, mutually opposing outputs, an input connected to be controlled by the integrator and having two quasi-stable operating states and a hysteresis control characteristic which requires a control voltage variation between predetermined critical limits to reverse the operating state, means to bias the trigger circuits individually to establish the sets of critical limits of the respective trigger circuits at successively different values for sequential operation responsively to a progression of integrator output voltage-controlled $y$ gates interposed between the generator output and at least certain of the respective column conductors, corresponding voltage-controlled feedback gates interposed between the integrator input summing device and at least certain of the respective feedback potentiometer outputs, at least certain of such $y$ gates and corresponding feedback gates each having a first control input connected to the second output of the corresponding trigger circuit and having a second control input connected to the first output of the next succeeding trigger circuit.

19. Computer means for interpolating for values of a function $z=f(y)$ between two predetermined values of $z$, comprising first and second conductors carrying the respective predetermined values for $z$, a computer output, an integrator having a summing device in its input, to which an electrical value for the variable $y$ is applicable, separate sources of feedback voltages respectively representing the coordinate values of $y$ for the respective predetermined values of $z$, voltage-controlled switching means controlled by the integrator output and operable alternately, first to connect one such conductor to the computer output and the associated feedback source to the summing device, then to connect the other such conductor to the computer output and the other feedback source to the summing device, whereby variations in the value of $y$ between said coordinate values thereof produce variations in the ratio of the periods during which the respective predetermined values of $z$ are applied to the output, and means in the output detecting the time-weighted average of such applied values.

20. Computer means for interpolating for values of a function $z=f(y)$ between two predetermined values of $z$, comprising first and second conductors carrying the respective predetermined values for $z$, a computer output, a computer input having a summing device to which an electrical value for the variable $y$ is applicable, separate sources of reference voltages respectively representing the coordinate values of $y$ for the respective predetermined values of $z$, means including said summing device controlled by the reference voltages and the value of $y$, and operable alternately, first to connect one such conductor to the computer output and the associated reference source to the summing device, then to connect the other such conductor to the computer output and the other reference source to the summing device, whereby variations in the value of $y$ between said coordinate values thereof produce variations in the ratio of the periods during which the respective predetermined values of $z$ are applied to the output.

21. Computer means for interpolating for values of a function $z=f(y)$ between two predetermined values of $z$, comprising first and second conductors carrying the respective predetermined values for $z$, a computer output means, including sources of reference voltages representing the coordinate values of $y$ for the respective predetermined values of $z$, controllable by an electrical value of $y$ and operable to connect the computer output to the first and second conductor alternately in rapid sequence for time periods inversely proportional to the differences between the respective coordinate values of $y$ and the instantaneous value of $y$, and means in the output detecting the time-weighted average of such applied values.

22. A system of interpolating for values of a function $z=f(x)$ as the variable $x$ varies through a range including a succession of established coordinate values thereof corresponding to predetermined values for $z$, said system including a series of $z$-voltage sources operable in direct successive order in response to said variation of $x$ and each producing, when operative, an output voltage which changes substantially linearly with a change of $x$ from an initial quiescent value to a final quiescent value related to the value of $z$ as $x$ changes from one coordinate value to the next, and output means summing said output voltages, each of said coordinate values of the $z$-related output voltages being established at a value which when summed algebraically with the similar values numerically preceding the same in the series produce a resultant which is related to $z$.

23. The system defined in claim 22, wherein the output voltages are of the same polarity, and a negative function generator responsive to said variation of $x$ and supplying to the output means a linearly increasing voltage the increment of which is equal for each change of $x$ from one coordinate value to the next.

24. A system for computing the value of a function $z=f(x;y)$ by interpolating between successive established values for $z$ along coordinate scales for $x$ and $y$, comprising means forming a matrix of electric circuit values related to the corresponding established values for $z$ arranged effectively in rows and columns distributed along the respective coordinate scales at locations corresponding electrically to predetermined $x$ scale and $y$ scale coordinate values, means deriving electrically within each column a summation of those electric circuit values located in rows of lesser $x$ scale coordinate value than the instantaneous value for $x$, plus a fraction of the next succeeding electric circuit value, which fraction equals the ratio of the difference between the instantaneous value for $x$ and the highest such lesser $x$ scale coordinate value to the difference between such latter coordinate value and the next higher such coordinate value, said values within each column each being established in relation to the summation of the values preceding it in the column whereby the first-mentioned summation is proportional to the instantaneous value of $x$, and means electrically deriving the weighted average of the summations in successively adjacent columns whose $y$ scale values lie respectively on either side of the instantaneous value of $y$.

25. The system defined in claim 24, wherein the last-mentioned means includes circuit apparatus alternately applying the two summations to a circuit point repetitiously for periods inversely proportional to the differences between the instantaneous values of $y$ and the respective column $y$ scale values for $y$, and deriving the time-weighted average value of the applied summations.

26. A system for computing the value of a function $z=f(x)$ by interpolating between successive established values for $z$ along a coordinate scale for $x$, comprising means establishing a succession of electric circuit values related to the corresponding established values for $z$ distributed along the coordinate scale at predetermined $x$ scale coordinate values, and means cooperable therewith deriving electrically a summation of those electric circuit values located at lesser $x$ scale coordinate values than the instantaneous value for $x$, plus a fraction of the next succeeding electric circuit value, which fraction equals the ratio of the difference between the instantaneous value for $x$ and the highest such lesser $x$ scale coordinate value to the difference between such latter coordinate value and the next higher such coordinate value, said values within each column each being established in relation to the summation of the values preceding it in the column whereby the first-mentioned summation is proportional to the instantaneous value of $x$.

References Cited by the Examiner

UNITED STATES PATENTS

| | | | |
|---|---|---|---|
| 2,428,811 | 10/47 | Rajchman. | |
| 2,797,865 | 7/57 | Beattie et al. | 235—197 |
| 2,925,220 | 2/60 | Serrell | 235—197 |
| 2,976,430 | 3/61 | Sander. | |
| 3,025,000 | 3/62 | Taback | 235—197 |

MALCOLM A. MORRISON, *Primary Examiner.*

WALTER W. BURNS, Jr., *Examiner.*